(12) United States Patent
Cuche et al.

(10) Patent No.: US 12,436,500 B2
(45) Date of Patent: Oct. 7, 2025

(54) IMAGING SYSTEM FOR IMAGING IN A CONTROLLED ENVIRONMENT

(71) Applicant: LYNCEE TEC SA, Lausanne (CH)

(72) Inventors: Etienne Cuche, Lausanne (CH); Yves Emery, Lausanne (CH)

(73) Assignee: LYNCEE TEC SA, Lausanne (CH)

( * ) Notice: Subject to any disclaimer, the term of this patent is extended or adjusted under 35 U.S.C. 154(b) by 0 days.

(21) Appl. No.: 17/434,652

(22) PCT Filed: Feb. 28, 2019

(86) PCT No.: PCT/IB2019/051600
§ 371 (c)(1),
(2) Date: Aug. 27, 2021

(87) PCT Pub. No.: WO2020/174266
PCT Pub. Date: Sep. 3, 2020

(65) Prior Publication Data
US 2022/0171332 A1    Jun. 2, 2022

(51) Int. Cl.
*H04N 5/225* (2006.01)
*F21V 8/00* (2006.01)
(Continued)

(52) U.S. Cl.
CPC ......... *G03H 1/0402* (2013.01); *G02B 6/0008* (2013.01); *G02B 21/02* (2013.01);
(Continued)

(58) Field of Classification Search
CPC .. G03H 1/0402; G03H 1/0005; G03H 1/0443; G03H 1/0465; H04N 23/51; H04N 23/56; G02B 21/02; G02B 6/0008
See application file for complete search history.

(56) References Cited

U.S. PATENT DOCUMENTS 5,000,533 A  *  3/1991  Gerwers ............ G02B 23/2492
                                                       385/117
5,592,151 A      1/1997  Rolih
(Continued)

FOREIGN PATENT DOCUMENTS

EP      1119798 A1    8/2001
JP    2006-114648     4/2006
(Continued)

OTHER PUBLICATIONS

International Search Report for PCT/IB2019/051600 dated Nov. 19, 2019, 4 pages.
(Continued)

*Primary Examiner* — Jonathan R Messmore
(74) *Attorney, Agent, or Firm* — Nixon & Vanderhye P.C.

(57) ABSTRACT

The present disclosure concerns an imaging system for imaging a sample immersed in a controlled environment. The system comprises—at least one enclosure configured to hold at least one imaging sensor or camera inside the enclosure, the enclosure including at least one opening and at least one transparent window for imaging the sample; and—a flexible channel comprising a first extremity and a second extremity, the first extremity being connected to the enclosure at said at least one opening and the second extremity being configured to be connected to a wall of the hermetic chamber, the flexible channel defining or enclosing a passage extending through the flexible channel and to or into the enclosure.

19 Claims, 5 Drawing Sheets

(51) Int. Cl.
*G02B 21/02* (2006.01)
*G03H 1/00* (2006.01)
*G03H 1/04* (2006.01)
*H04N 23/51* (2023.01)
*H04N 23/56* (2023.01)

(52) U.S. Cl.
CPC ......... *G03H 1/0005* (2013.01); *G03H 1/0443* (2013.01); *G03H 1/0465* (2013.01); *H04N 23/51* (2023.01); *H04N 23/56* (2023.01); *G03H 2001/005* (2013.01); *G03H 2001/0445* (2013.01); *G03H 2223/16* (2013.01); *G03H 2227/00* (2013.01)

(56) References Cited

U.S. PATENT DOCUMENTS

| | | | |
|---|---|---|---|
| 6,262,818 | B1 | 7/2001 | Cuche et al. |
| 7,649,160 | B2 | 1/2010 | Colomb et al. |
| 9,991,091 | B1* | 6/2018 | Durller .............. G02B 21/0016 |
| 2006/0238772 | A1* | 10/2006 | Hanson .................... G03H 1/28 356/484 |
| 2008/0259444 | A1* | 10/2008 | Smith .................. H04N 3/1593 359/396 |
| 2013/0342673 | A1* | 12/2013 | Sticker ................. G02B 21/245 348/79 |
| 2016/0252880 | A1* | 9/2016 | Sánchez Ortiga ..... G02B 13/22 359/30 |
| 2018/0270474 | A1* | 9/2018 | Liu ...................... H04N 13/254 |
| 2018/0376119 | A1* | 12/2018 | Iwane ................... H04N 23/88 |

FOREIGN PATENT DOCUMENTS

| | | | |
|---|---|---|---|
| JP | 2006114648 A | * | 4/2006 |
| WO | 2018/078417 | | 5/2018 |

OTHER PUBLICATIONS

Written Opinion of the ISA for PCT/IB2019/051600 dated Nov. 19, 2019, 8 pages.

Cuche, Etienne, et al., "Digital holography for quantitative phase-contrast imaging", Optics Letters, vol. 24, No. 5, Mar. 1, 1999, pp. 291-293.

Cuche, Etienne, et al., "Simultaneous amplitude-contrast and quantitative phase-contrast microscopy by numerical reconstruction of Fresnel off-axis holograms", Applied Optics, vol. 38, No. 34, Dec. 1, 1999, pp. 6994-7001.

* cited by examiner

IMAGING SYSTEM FOR IMAGING IN A CONTROLLED ENVIRONMENT

This application is the U.S. national phase of International Application No. PCT/IB2019/051600 filed Feb. 28, 2019 which designated the U.S., the entire contents of which are hereby incorporated by reference.

FIELD OF THE INVENTION

The present disclosure relates to the field of vision or imaging systems for imaging objects or samples embedded in controlled environments. More precisely the present disclosure allows one or more vision systems to be positioned flexibly within a hermetic chamber such as a vacuum chamber, while keeping the sensitive components of the vision system at atmospheric pressure.

BACKGROUND

Visual inspection inside a vacuum chamber is most commonly achieved through transparent window called viewports inserted on the vacuum chamber wall. In large vacuum chambers, such as process vacuum chambers, the distance between a viewport and a sample to be observed can be long and will limit the performances of the vision/visioning system. When short working distances are required, for example with vision systems using lens with short working distances or using microscope objectives to achieve large magnifications, the sample to be observed must be located very close to the viewport, thus strongly limiting integration possibilities around the sample. Therefore, when a short working distance is required for a sample located at a large distance of the chamber walls, it becomes mandatory to integrate the vision system inside the chamber.

A first option to integrate a vision system inside vacuum consists in adapting the vision system design for vacuum compatibility, meaning that most of its components, such as cameras, light sources, optics, mechanical elements and cables, must be specifically designed for vacuum compatibility. As well, the interfaces of a vision system, required for transmitting the camera signal and the power supply must be vacuum compatible.

For pressures over $10^{-5}$ mbar in the vacuum chamber, in the so-called low or medium vacuum levels, vacuum compatibility is manageable. At these low or medium vacuum levels, the most critical point concerns heat dissipation for power consuming components of a vision system, and solid heat transfer bridges must thus be realized and implemented between the vacuum chamber wall and the camera and light source. Another critical point concerns the transmission of the camera signal. Even if so called vacuum feedthrough connectors can be used to transmit electrical power and signals across a vacuum chamber wall, camera interfaces requiring high transfer rates may cause reliability issues if such interconnections are not supported by the camera.

When entering the so-called high vacuum level, with a pressure below $10^{-5}$ mbar in the vacuum chamber, vacuum compatibility becomes much more challenging. First of all, the mechanical design of each single part and assembly must be carefully adapted to avoid trapped gas volumes causing so-called virtual leaks. Second all materials, including adhesives fixtures and cables, must be carefully selected to minimize outgassing. Finally, vacuum embedded devices must be resistant to demanding cleaning processes, water desorption processes, and abrupt pressure changes.

These high vacuum requirements are particularly demanding for the camera of a vision system. Present technical solutions for high vacuum embedded cameras are restricted to specialized detection purposes for X-ray or UV radiation detection, and standard industrial or scientific cameras are not yet available with vacuum compatible specifications.

SUMMARY

It is therefore one aspect of the present disclosure to provide an imaging system that overcomes the above challenges. The present disclosure thus relates to an imaging system for imaging a sample immersed in a controlled or set environment (or atmosphere) defined or confined by a hermetic chamber.

The imaging system comprises
at least one enclosure configured to hold at least one imaging sensor or camera inside the enclosure, the enclosure including at least one opening and at least one transparent window for imaging the sample; and
a flexible channel comprising a first extremity and a second extremity, the first extremity being connected to the enclosure at said at least one opening and the second extremity being configured to be connected to a wall of the hermetic chamber, the flexible channel defining or enclosing a passage extending through the flexible channel and to or into the enclosure.

According to an aspect of the present disclosure, the flexible channel comprises or consists of an elongated vessel configured to be compressed and extended and defining or enclosing said passage; or the flexible channel comprises or consists of a corrugated or convoluted body defining or enclosing said passage.

According to another aspect of the present disclosure, the flexible channel comprises or consists of a flexible bellows or a flexible metallic bellows.

According to an aspect of the present disclosure, the at least one enclosure is configured to hold at least one or a plurality of imaging elements or imaging means.

According to another aspect of the present disclosure, the system further includes a hermetic chamber configured to define or confine said controlled environment, wherein the at least one enclosure is contained inside the hermetic chamber, and wherein the second extremity of the flexible channel is connected to the hermetic chamber.

According to another aspect of the present disclosure, the flexible channel and/or enclosure are configured to define or enclose an environment different to the controlled environment.

According to another aspect of the present disclosure, the second extremity is connected to the wall of the chamber at an opening of the chamber wall.

According to another aspect of the present disclosure, the first extremity comprises or consists of an open extremity, and the second extremity comprises or consists of an open extremity.

According to another aspect of the present disclosure, the flexible channel defines a volume containing an environment isolated from the environment enclosed by the hermetic chamber.

According to another aspect of the present disclosure, the flexible channel is located inside the hermetic chamber.

According to another aspect of the present disclosure, the enclosure is a rigid sealed enclosure.

According to another aspect of the present disclosure, the system further comprises the at least one imaging sensor or camera located inside said at least one sealed enclosure.

According to another aspect of the present disclosure, said at least one sealed enclosure includes optical components arranged to carry out optical imaging, or microscopy imaging or interferometric imaging or holographic imaging of the sample.

According to another aspect of the present disclosure, said controlled environment is a different environment to an environment enclosed by the enclosure and/or the flexible channel.

According to another aspect of the present disclosure, the flexible channel defines or encloses an environment that is the same or substantially the same as the environment defined or enclosed by the enclosure.

According to another aspect of the present disclosure, the system further includes a mounting element attached to the enclosure and the chamber, wherein the mounting element is configured to displace the enclosure inside the chamber.

According to another aspect of the present disclosure, the flexible channel is configured to transport thermal energy away from the enclosure to cool the environment of the enclosure.

According to another aspect of the present disclosure, the system further includes a mounting element attached to the enclosure and to a surface of the chamber, wherein the mounting element is configured to displace the enclosure inside the chamber.

According to another aspect of the present disclosure, the system further comprises:
- at least one imaging element or imaging means configured to form an image of said sample on said camera by collecting radiation propagating from said sample and passing through said transparent window.

According to another aspect of the present disclosure, the system further comprises:
- at least one camera interface cable passing through said flexible channel and configured to transmit images or image data captured by the camera to a display means or a monitor or to a computer or processing means.

According to another aspect of the present disclosure, an interior of an assembly formed by said enclosure and said flexible channel is at ambient conditions and sealed with respect to said controlled environment.

According to another aspect of the present disclosure, the system further comprises:
- at least one light source located outside said hermetic chamber and configured to provide said radiation,
- illumination means located inside said enclosure and configured to direct said radiation towards said sample to illuminate said sample with said radiation,
- at least one flexible light guide passing through said flexible channel and guiding said radiation from said at least one light source to said illumination means.

According to another aspect of the present disclosure, the system further comprises:
- at least one light source located outside said hermetic chamber and providing said radiation,
- illumination means located inside said hermetic chamber and configure to direct said radiation towards said sample to illuminate said sample with said radiation,
- a least one optical fiber feedthrough located in and crossing the wall of said hermetic chamber,
- a least one flexible light guide configured to guide said radiation from the at least one light source to the at least one o optical fiber feedthrough, and
- at least one second flexible light guide configured to guide said radiation from the at least one optical fiber feedthrough to said illumination means.

According to another aspect of the present disclosure, the system further comprises:
- a coherent light source located outside said hermetic chamber and configured to provide said radiation,
- a fiber or fiber source configured to guide said radiation from said coherent light source to a fiber splitter, said fiber splitter being configured to split the radiation from said fiber source and provide the split radiation into an object fiber and into a reference fiber,
- illumination means arranged to collect radiation from said object fiber, and direct said radiation towards said sample to illuminate said sample with said radiation,
- a reference wave creation unit located inside said enclosure, said reference wave creation unit being configured to collect radiation from said reference fiber, and to form a reference wave, from d said radiation, directed towards said camera,
- splitting means adapted combine radiation arriving from different directions, and wherein said illumination means, said imaging means, said splitting means and said reference wave creation unit are arranged in such a way that said camera may record a hologram or an interferogram resulting from an interference between an object wave and the reference wave, wherein said object beam is provided by said imaging means.

According to another aspect of the present disclosure, said illumination means are located inside said enclosure and wherein said flexible channel is traversed by at least one of the reference fiber, the object fiber, or the fiber connecting said coherent source to said fiber splitter.

According to another aspect of the present disclosure
- said fiber splitter is located outside said hermetic chamber,
- said object fiber passes through said flexible channel,
- said illumination means is located inside said hermetic chamber,
- said hermetic chamber comprises at least one optical fiber feedthrough,
- said reference fiber is connected on an external side of said optical fiber feedthrough, said external side being located outside the chamber,
- said illumination means is connected to an internal side of said optical fiber feedthrough by an additional fiber located inside said hermetic chamber, said internal side being located inside the chamber.

According to another aspect of the present disclosure, said hologram or interferogram is of the off-axis type, meaning that the propagation direction of said reference wave has a given angle or defines a predetermined angle with respect to a propagation direction of said object wave when these two waves arrive on a sensor of said camera.

According to another aspect of the present disclosure, the system is adapted for dual-wavelength digital holographic microscopy by further comprising:
- at least one additional coherent light source,
- at least one additional fiber or fiber source,
- at least one additional fiber splitter,
- at least one additional object fiber,
- at least one additional reference fiber,
- at least one additional reference wave creation unit, and dichroic elements, and wherein said illumination means, said imaging means, said splitting means, said dichroic elements and said reference wave creation units are arranged to permit said camera to record a hologram resulting from interference between two co-linear object waves and two reference waves defined with different off-axis angles.

According to another aspect of the present disclosure, at least one of: said fiber source or fiber sources, said object fiber or object fibers and said reference fiber or reference fibers is composed of distinct fiber portions connected by fiber-to-fiber connections.

According to another aspect of the present disclosure, at least one of said fiber-to-fiber connection comprises a portion with free-space beam propagation enabling to insert optical filters and/or polarization management elements.

According to another aspect of the present disclosure, at least one of said fiber-to-fiber connection comprise a motorized or manual optical delay line.

According to another aspect of the present disclosure, said imaging means comprises a microscope objective located inside said enclosure.

According to another aspect of the present disclosure, said imaging means comprises a microscope objective located inside said hermetic chamber and a tube lens located inside said enclosure.

According to another aspect of the present disclosure, the hermetic chamber comprises or consist of a process chamber for performing etching or material deposition; or an incubator; or an environmental chamber for incubating biological cells.

According to another aspect of the present disclosure, said controlled environment comprises or consists of a vacuum.

According to another aspect of the present disclosure, the vacuum is a low vacuum (between $1\times10^5$ to $3\times10^3$ Pa), or a medium vacuum (between $3\times10^3$ to $1\times10^{-1}$ Pa) or a high vacuum (between $1\times10^{-1}$ to $1\times10^{-7}$ Pa) or a ultra-high vacuum (between $1\times10^{-7}$ to $1\times10^{-10}$ Pa) or an extremely high vacuum ($<1\times10^{-10}$ Pa).

According to another aspect of the present disclosure, said controlled environment that is a different environment to the environment or atmosphere enclosed by the enclosure and/or the flexible channel consists of an atmosphere or environment having a different chemical composition or a different humidity, or a different temperature, or a different pressure.

According to another aspect of the present disclosure, the system includes optical components arranged to carry out optical imaging, or microscopy imaging or interferometric imaging or holographic imaging of the sample.

The present invention also concerns a method for imaging a sample immersed in a controlled environment or a predetermined atmosphere defined or confined by a chamber. The method including the steps of:
  providing the imaging system as previously disclosed above;
  setting the controlled environment or predetermined atmosphere in the chamber; and
  acquiring images or image data from the sample using the image sensor or camera.

The imaging or visioning systems of the present disclosure can be of various dimensions and can be freely disposed inside large vacuum chambers with vacuum sensitive components operating at atmospheric pressure. This is made possible by use of a flexible connection linking a vacuum chamber wall and an enclosure inside the chamber, the enclosure being able to hold sensitive parts of the vision system. When the pressure inside the vacuum chamber is at vacuum pressure, the pressure inside the assembly formed by the enclosure and the flexible connection remains, for example, at atmospheric pressure.

Vacuum installations use flexible tubing to interconnect vacuum volumes with misaligned mechanical connections. A typical case is the connection of a vacuum pump to a vacuum chamber. With the present invention, similar flexible tubing solutions are used in a reverse pressure regime, i.e. with atmospheric pressure inside and vacuum outside, for connecting a volume inside a vacuum chamber to atmospheric pressure.

An advantageous element of the present disclosure is that the volume at atmospheric pressure located inside vacuum is delimited by for example a rigid sealed enclosure comprising a transparent window. Another advantageous element of the present disclosure is that the rigid sealed enclosure at atmospheric pressure located inside vacuum contains a camera and means enabling this camera to capture an image of a sample located in vacuum by collecting radiations propagating from the sample to the camera across the transparent window. Apparatus according to the present disclosure are therefore used for imaging inside vacuum.

Another advantage of the present invention is that the flexible connection between the vacuum chamber wall and the enclosure at atmospheric pressure offers a great flexibility to position imaging systems at various locations inside a vacuum chamber. Apparatus according to present invention are therefore particularly well adapted when imaging systems inside vacuum require short working distances to the sample, such as microscopy imaging systems using microscope objectives to produce magnified images of a sample.

Another advantage of the present disclosure is that the components of an imaging system can operate at atmospheric pressure. As a result, apparatus according to present disclosure can operate with standard cameras without adaptations, including for the camera interface, because the camera can be directly linked to a monitor or to a personal computer by a cable following the path of the flexible connection. This feature is of particular interest when high frame rates are required, such as for optical inspection, or for high speed monitoring of processes in vacuum.

The path of the flexible connection can also be advantageously used to guide optical fibers and light guides, providing solutions to bring radiation sources close to the sample for illuminating it. Moreover, it will become apparent in what follows, that this possibility to transmit optical fibers trough the flexible connection, coupled to the feature of atmospheric pressure operation, enable to easily integrate complex opto-mechanical designs, such as those required for interferometric or holographic imaging systems, when recorded images result from an interference between an object wave propagating from the sample, and a reference wave issued from same radiation source, but reaching the camera without interacting with the sample. As interferometric or holographic imaging systems provide the phase of a radiation, in addition to its intensity or amplitude, apparatus according to the present invention can be used for in-vacuum phase imaging and measurements, including surface topography measurements, optical thickness measurements, refractive index measurements, or reflectometry measurements, in both transmission and reflection configurations to study respectively transparent or reflective samples.

As examples of interferometric or holographic imaging systems appropriate for making advantageous use of the present disclosure for being adapted for in-vacuum operation, one can cite: lensless holographic setups, digital holographic microscopes, interference microscopes, white light interferometers, vertical scanning interferometer, interferometric optical surface profilers, interferometers, phase-shifting interferometer, ellipsometers and optical instruments making use of interference processes for three-dimensional tomographic imaging.

Although present disclosure is primarily useful for designing imaging systems for inspection inside vacuum, systems and apparatus according to present disclosure can also be used for imaging application inside other controlled environments. Indeed, the rigid sealed enclosure surrounding the sensitive elements of an imaging system fulfills protection and isolation functions, which can be advantageously exploited for imaging applications inside harsh or sensitive environments in general.

BRIEF DESCRIPTION OF THE DRAWINGS

The above object, features and other advantages of the present invention will be best understood from the following detailed description in conjunction with the accompanying drawings, in which.

Herein, identical reference numerals are used, where possible, to designate identical elements that are common to the Figures.

DETAILED DESCRIPTION OF SEVERAL EMBODIMENTS

Figure 1:
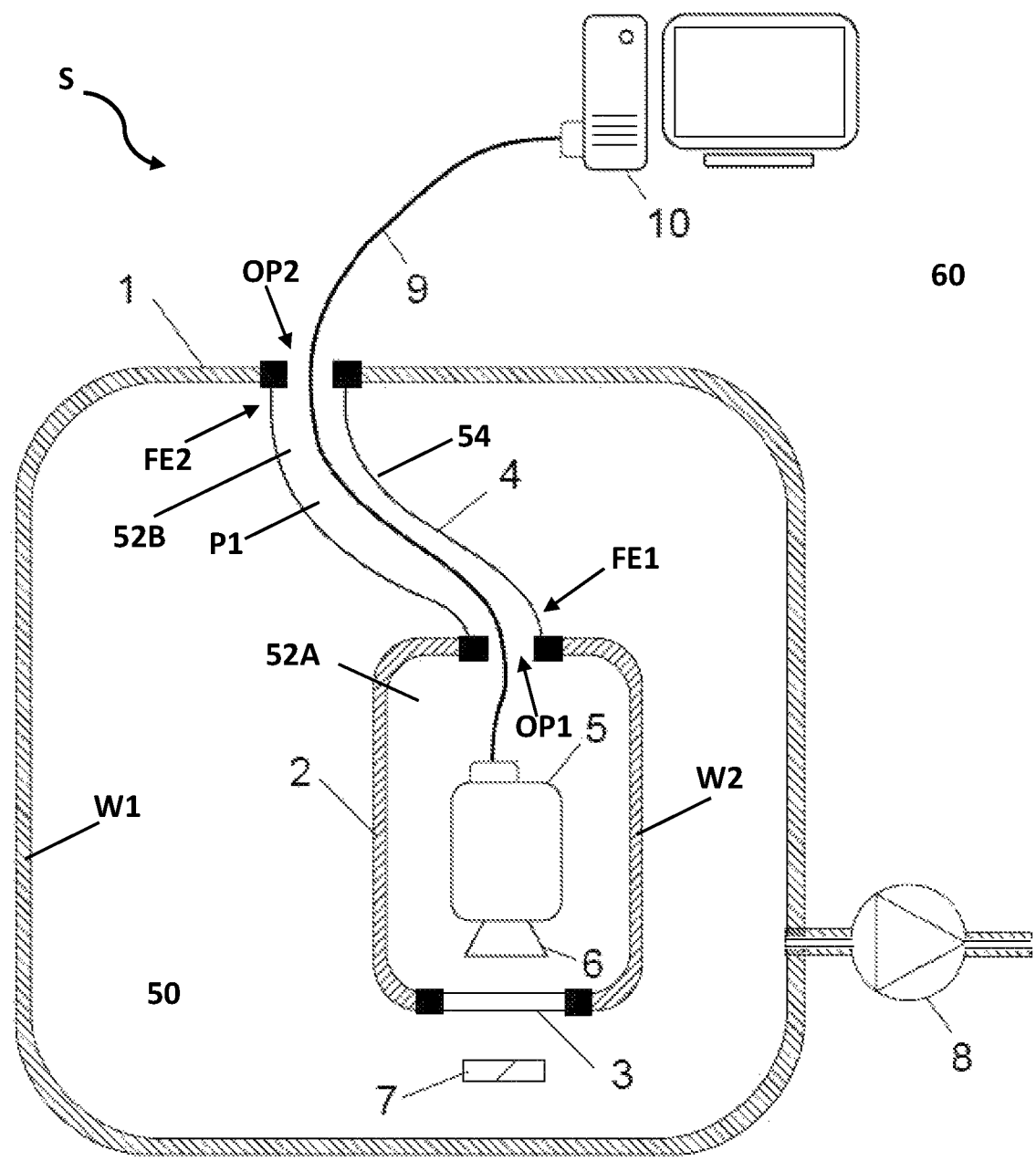
FIG. 1 depicts an exemplary implementation of an imaging system according to present disclosure including a camera.

Exemplary embodiments of an imaging system (S) according to the present disclosure are shown in FIGS. 1 to 6.

The imaging system (S) is configured to image an object or sample (7) immersed in a controlled environment (50) of an atmospherically isolated chamber or a hermetic chamber (1).

The imaging system (S), for example, includes at least one enclosure (2) configured to hold at least one imaging sensor or camera (5) inside the enclosure (2). The enclosure (2) may include at least one opening (OP1) and at least one transparent window (3) for imaging the sample (7).

The system (S) also includes a flexible channel or connection (4) comprising a first extremity (FE1) and a second extremity (FE2).

The first extremity (FE1) can be connected to the enclosure (2) at the opening (OP1) and the second extremity (FE2) can be connected to a wall (W1) of the hermetic chamber (1). The second extremity (FE2) can be connected to the wall (W1) of the chamber (1) at an opening (OP2) of the chamber wall (W1). The flexible channel (4) defines a passage (P1) extending through the flexible channel (4) and to or into the enclosure (2).

The enclosure (2) is configured to hold at least one or a plurality of imaging elements or imaging means (6). The sealed enclosure (2) can be, for example, a rigid sealed enclosure.

The imaging system (S) may further include the hermetic chamber (1) configured to define or confine the controlled environment (50). The enclosure (2) and the flexible channel (4) are located inside the hermetic chamber (1). The flexible channel (4) and/or enclosure (2) are configured to define or enclose an environment (52B) different to the controlled environment (50). The flexible channel (4) defines a volume containing an environment (52B) isolated from the environment (50) enclosed by the hermetic chamber (1).

The flexible channel (4) may define or enclose an environment (52B) that is the same or substantially the same as the environment (52A) defined or enclosed by the enclosure (2).

A first exemplary implementation of an apparatus according to present disclosure is presented in FIG. 1. It comprises:

A chamber or box (1), for example a hermetic chamber. This chamber (1) can optionally be connected to a vacuum pump (8).

A sealed enclosure (2), comprising a transparent window (3). The sealed enclosure (2) is for example a rigid sealed enclosure.

A flexible channel or flexible connection (4), fixed at one end (FE2) to the hermetic chamber (1), and at the other end (FE1) to the rigid sealed enclosure (2). A flexible channel or flexible connection (4) includes, for example, a first open extremity (FE1) and a second open extremity (FE2). The ensemble formed by the rigid sealed enclosure (2) and the flexible connection (4) is hermetic with respect to the interior of the hermetic chamber (1), and opened on the exterior of the hermetic chamber (1).

A least one image sensor or camera (5) located inside the rigid sealed enclosure (2), with at least one interconnection link or interface cable (9) passing inside the flexible connection (4). The interface cable (9) can be connected outside the hermetic chamber, optionally to a power supply, and/or to a personal computer (10), and/or to a monitor.

Imaging means (6) adapted to form an image of a sample (7) located inside the hermetic chamber (1), by collecting radiations propagating from the sample (7) to the camera (5) through the transparent window (3).

In a preferred embodiment, the hermetic chamber (1) can be or can comprise a vacuum chamber. The chamber defines an enclosure or closed space 50 in which a specified or predetermined environmental condition is set or defined. The chamber has a general function to confine or define an environment or a controlled environment with a specific property or properties. Such properties can be, for example, chemical composition, humidity, temperature, or pressure. This controlled environment can be for example vacuum, gaseous or liquid. This controlled environment can also be or comprise a plasma environment.

Optionally, the hermetic chamber (1) can be connected to an environment controlling device (8) such as: vacuum pumps, heater or cooler, gas supply, or valves.

The chamber (1) is configured to confine or provide, for example, a vacuum that is a low vacuum (between $1\times10^5$ to $3\times10^3$ Pa), or a medium vacuum (between $3\times10^3$ to $1\times10^{-1}$ Pa) or a high vacuum (between $1\times10^{-1}$ to $1\times10^{-7}$ Pa) or a ultra-high vacuum (between $1\times10^{-7}$ to $1\times10^{-10}$ Pa) or an extremely high vacuum ($<1\times10^{-10}$ Pa).

In one embodiment of the present invention, the hermetic chamber (1) can be or comprise a process chamber as used for example in the semiconductor industry to perform etching or deposition processes. In one embodiment of the present invention, the hermetic chamber (1) can be or comprise an incubator or an environmental chamber as used for incubating biological cells. The hermetic chamber (1) can also, for example, be or comprise an environmental test chamber, a bioreactor, or an oven.

A particular feature of the present disclosure is that an interior or environment (52) of the assembly formed by the rigid sealed enclosure (2) and the flexible connection (4) is at ambient conditions and sealed with respect to or isolated from the controlled environment (50) confined or defined by the hermetic chamber (1). Ambient conditions means here an environment identical or at least similar to the environment (60) outside the hermetic chamber (1) or external to the space defined by the wall or walls (W1) of the chamber (1).

For example, if the hermetic chamber (1) is in a room at atmospheric pressure, the interior (52A) of the rigid sealed enclosure (2) and the interior (52B) of the flexible connection (4) will also be at atmospheric pressure. This similarly applies as well for example for temperature and/or humidity conditions. Ambient conditions as used in this context doesn't obligatory mean a non-controlled environment, the hermetic chamber (1) can indeed be located inside a specifically defined or confined environment (60) with its own specific controls, such as chemical composition control, temperature control, and/or pressure control.

The rigid sealed enclosure (2) comprises or consists of a sealed box or container configured, for example, to carry out at least two main functions:
a) Preserving the controlled environment (50) defined or confined by the hermetic chamber (1) from being contaminated by the internal components of the rigid sealed enclosure (2). For example, if the hermetic chamber (1) is a vacuum chamber, the rigid sealed enclosure (2) protects the vacuum environment (50) from outgassing and virtual leaks caused by, for example, components such as the camera (5) and/or imaging elements/means (6).
b) Preserving its internal components from being affected by the controlled environment (50). For example, if the hermetic chamber (1) confines an environment (50) with a high level of humidity, the rigid sealed enclosure (2) is configured to protect the camera (5) and the imaging means (6) from being damaged or disturbed by these environmental conditions (50).

Although not presented in the schematic view of FIG. 1, the rigid sealed enclosure (2) can be fixed or attached inside the hermetic chamber (1) to the chamber (1). This can be done, for example, by using mechanical elements, parts or attachments configured to attach or link a wall (W2) of the rigid sealed enclosure (2) to a wall or surface (W1) of the chamber (1).

As well, fixtures or mounting elements can be included inside the rigid sealed enclosure (2) for mounting the camera (5) and/or imaging elements/means (6) to a surface or wall (W2) of the rigid sealed enclosure (2). This permits the different elements of the optical/vision system to be relatively positioned one with respect to the other and to be positioned with respect to an opening (OP1) of the enclosure (2).

Optionally, the rigid sealed enclosure (2) can be fixed or mounted on a linear translation stage(s), manual or motorized, for translating or displacing it along one, two or three axes. Elements for rotation and/or angular adjustment or tilt of the rigid sealed enclosure (2) can also be included, both manually or with motorized devices. Motion or displacement of the rigid sealed enclosure (2) inside the hermetic chamber (1) may however be limited by the length and elasticity of the flexible connection (4). The above-mentioned stages, elements or devices can be attached or fixed directly or indirectly via a mounting element to the wall (W1) of the chamber (1).

The rigid sealed enclosure (2) may also optionally comprises a detachable cover or several detachable covers to facilitate the installation and assembly of components such as the camera (5) and the imaging means (6). If the rigid sealed enclosure (2) comprises a detachable cover, adding a mechanical seal might be required to ensure proper sealing, and metallic seals, for example copper, or aluminium, or silver, or gold, or indium seals should be preferred to minimize potential contamination compared to elastomer seals. Such a metallic seal can be of the shaped type, such as a C-ring seals with a C-shaped cross-section. Such a metallic seal can be of the spring loaded or spring energized type. Materials used to realize or treat or cover the exterior of the rigid sealed enclosure (2) should be chosen as inert as possible and volatile organic compounds (VOCs) should be avoided. In a preferred embodiment, the rigid sealed enclosure (2) comprises or is mainly realized in stainless steel or in aluminum, but other materials can be chosen.

In a preferred embodiment of the present invention, the transparent window (3) is a glass window. In situations requiring low thermal expansion, a borosilicate glass can be advantageously chosen. The diameter of the transparent window (3) is chosen large enough to avoid limiting the desired field of view as defined by the imaging means (6), and its minimal thickness is defined to resist to the pressure differential between its two faces. Optionally, the transparent window (3) can be anti-reflection coated. Optionally the surface of the transparent window (3) can be coated to block undesired radiations, such as UV or infrared radiations. Anti-condensation coatings can also be applied on the transparent window (3).

The fixation or attachment attaching the transparent window (3) on the rigid sealed enclosure (2) should preferable ensure proper sealing and avoid constraints that damage the transparent window (3). Advantageously, the transparent window (3) can be integrated as a so-called vacuum viewport as commonly defined in vacuum technology, with a glass plate mounted on a flange, which can be fixed on the rigid sealed enclosure (2). Different flange type can be used (KF/QF, ISO, CF for conflat, wheeler or ASA) depending on desired pressure ranges and operation temperatures. Sealing can be achieved for example with removable O-ring seals, but the glass window can also be permanently joined, for example by soldering or brasing. To prevent tension or stress that may result from temperature changes, or that may appear when fixing or mounting the glass window, an intermediate material like Kovar can be used to compensate for such tension or stress. When magnetic permeability is critical, tantalum, titanium or baked steel can be used as an intermediate material.

The rigid sealed enclosure (2) according to present disclosure comprises at least one transparent window (3), but several transparent windows (3) can be distributed on different sides of the rigid sealed enclosure (2). If the rigid sealed enclosure (2) comprises several transparent windows (3), several cameras with imaging means can be embedded inside the rigid sealed enclosure (2) to capture radiation from different samples located in different regions of the hermetic chamber (1), or from the same sample but from different locations of its surface. At least one ensemble composed of for example one camera (5) and imaging means (6) can also be orientated or steerable to image or provide access to different samples located at different locations in the hermetic chamber (1), or to different locations of the same sample, possibly through different transparent windows to acquire data from these different samples or sample locations.

In a particular embodiment, if the wall or walls (W2) of the rigid sealed enclosure (2) are sufficiently transparent to the radiation used to form an image, the rigid sealed enclosure (2) can fulfill the dual function of sealing and transparency, and a transparent window (3) defined previously as a separate element is not required, and the rigid sealed enclosure (2) is window-less.

The sealed enclosure (2) includes the opening (OP1) configured to receive a first extremity (FE1) of the flexible channel or connection (4). The first extremity (FE1) fully covers/encloses the opening (OP1) and is fixed to the enclosure (2). The first extremity (FE1) is attached at the opening (OP1) and forms a hermetic seal with the enclosure (2) to isolate the enclosure (2) and the flexible channel or connection (4) from the controlled environment 50. The flexible channel or connection (4) forms an extension of the enclosure (2) extending towards the wall (W1) of the chamber (1).

The first extremity (FE1) of the flexible channel or connection (4) may define a shape that is complementary or matching the shape of the opening (OP1).

The wall (W1) of the chamber (1) includes an opening (OP2) configured to receive a second extremity (FE2) of the flexible channel or connection (4). The second extremity (FE2) fully covers/encloses the opening (OP2) and is fixed to the chamber (1). The second extremity (FE2) is attached at the opening (OP2) and forms a hermetic seal with the wall (VV1) of the chamber (1) to isolate the flexible channel (4) and the enclosure (2) from the controlled environment 50 in the chamber (1).

The second extremity (FE2) of the flexible channel or connection (4) may define a shape that is complementary or matching the shape of the opening (OP2).

As a result, the attached flexible channel or connection (4) is sealed from the controlled environment 50 and defines an open passage extending from outside the chamber (1) through to the internal volume of the enclosure that is also sealed from the controlled environment (50).

Figure 2:
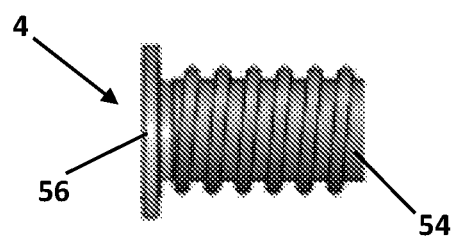
FIG. 2 depicts an exemplary implementation of a flexible channel or flexible connection of the imaging system of the present disclosure.

In a preferred embodiment, the flexible channel or connection (4) comprises or consists of a so-called bellow or bellows, for example a metallic bellow or bellows. FIG. 2 shows an exemplary embodiment of one end of the bellows.

The metallic bellow or bellows (that can for example comprise or consist of a convoluted bellow or vacuum hose, or corrugated hose, or sylphon) comprises or consists of, for example, a tube whose wall or walls (W3) are convoluted (or corrugated) as a series of successive sections or convolutions to provide lateral and axial elasticity.

The bellows comprises or consists of, for example, an elongated elastic/flexible vessel, chamber or tube configured to be compressed and extended, for example, repeatably or reversibly. The bellows, for example, comprises an elongated wall or walls (54) defining an enclosure (52B). The wall or walls (54) are at least partially or fully corrugated or comprise a plurality of convolutions running along the length of the wall or walls. The wall (54) can, for example, define a tube or define an elongated body of (substantially) cylindrical shape. The wall or walls (54) of the bellows are thus configured to provide lateral and axial elasticity/flexibility.

The metallic bellow defines for example a sealed spring, which can be bent, compressed or extended, and which retrieves its original shape when any forces applied thereto are released. In this disclosure, bellows that can be used to realize the flexible connection (4), are for example hydraulically formed bellows, or welded bellows or electroformed bellows.

In a preferred embodiment, the flexible connection (4) is mainly realized in stainless steel or in aluminum, but other materials can be chosen, such as copper, nickel or a nickel alloy, or inconel and/or titanium. As a metallic bellow is characterized by a yield strength, the length and the path of the flexible connection (4) should preferably be designed to minimize inelastic deformations of the bellow.

If the controlled environment (52) enclosed inside the rigid sealed enclosure (2) can accept it, rubber and/or plastic tubes can alternatively be used to realize the flexible connection (4). As well, the flexible connection (4) can comprise a mix of rigid and flexible portions.

Although it can be advantageous to minimize the length of the flexible connection (4), its path is not necessarily the most direct one, but can be extended if necessary to allow obstacles to be bypassed, or to allow its exit through the wall (W1) of the hermetic chamber (1) that is not the nearest wall (W1) to the rigid sealed enclosure (2). The diameter of the flexible connection (4) preferably at least allows the required connection means, links, cables or interfacing between components of the rigid sealed enclosure (2) and components outside the hermetic chamber (1) to pass there-through.

In a preferred embodiment, the flexible connection (4) is flanged, with flanges (56) on both ends (FE1, FE2) that can be attached onto the hermetic chamber (1) and onto the rigid sealed enclosure (2), for example, to cover/enclose and seal the opening (OP2) of the chamber (1) and the opening (OP1) of the enclosure (2).

Advantageously, flanges 56 at the ends of the flexible connection (4) are for example vacuum flanges of one the types: KF/QF (quick release flange), ISO flange, CF (conflat flange), wheeler (wire-seal flange) or ASA (ANSI flange standard). To ensure proper sealing, a gasket or a seal can be provided, such as elastomeric o-ring gaskets, or metal gaskets, that can be placed in a groove, and/or held in place by at least on separate metal ring.

The image sensor 5 may comprise or consist of, for example, a CMOS device or a CCD device comprising a plurality of pixels each configured to individually capture incoming light/radiation or an active pixel sensor (APS) containing an array of pixel sensors each comprising for example a photodetector and an amplifier. The image sensor or camera (5) may comprises or consists of for example a standard industrial or scientific camera with any of the standard camera interfaces: USB2, USB3, GiGe, Firewire, Camera Link, CoaxPress or PCI. The vision or imaging system of the present disclosure can also or alternatively integrate specialized imaging system using infrared cameras, or UV cameras, or X-ray cameras, or EM-CCD cameras, or InGaAs cameras, or time-delayed integration (TDI) cameras, as well as line scan cameras, or 3D time of flight (TOF) cameras, among others. The camera (5) can also be a cooled camera.

In a preferred embodiment, camera (5) heat dissipation and evacuation is achieved by mounting it with heat conductive elements (for example, metallic plates) inside the rigid sealed enclosure (2) and in thermal connection with the rigid sealed enclosure (2). The heat received by the rigid sealed enclosure (2) is, for example, dissipated through its fixtures or attachments to the hermetic chamber (1) via the flexible connection (4). If required, additional active or passive heat dissipation means can be added inside the rigid sealed enclosure (2) and/or inside the hermetic chamber (1).

As will become apparent in what follows, apparatuses according to present disclosure can integrate a large variety of imaging means (6), including imaging means for microscopy, or for interferometry, or for holography. As well, imaging means (6) can be partially located outside the rigid sealed enclosure (2) in the controlled environment confined by the hermetic chamber (1).

In the schematic example of FIG. 1, imaging means (6) is for example a camera lens, or a camera objective, as commonly used in machine vision. Although a single lens can be sufficient, standard camera lenses are assembly of lenses and often comprise means (for example, a motor) to control the opening and closing of an aperture. Both fixed focal lens and adjustable focal lens, or zoom lens systems can be used, as well as telecentric lenses. Both manual, and motorized displacement of camera lenses can be used to adjust the focal length and the aperture of the camera lens. Preferably the camera lens is optimized for the sensor size of the camera (5).

Apparatuses or systems according to present disclosure are particularly suited to imaging applications in semiconductor technology where manufacturing processes require controlled environments, and in this specific case the sample (7) can be or comprise, for example, a wafer at a given stage of a micro-fabrication process. The present disclosure is not however restricted to this field of application, and the sample (7) can be of any type requiring a controlled environment for its fabrication process, or for studying its properties, or for controlling its quality.

Another interesting field of application for apparatuses or system according to present disclosure is for imaging applications inside incubators or environmental chambers as used in life sciences to grow and maintain microbiological cultures or cell cultures. Here the main function of the rigid sealed enclosure (2) is to preserve its internal components against disturbances caused by a high level of humidity, such as condensation on optical or electronics elements.

The vacuum pump (8) shown in FIG. 1 is optional, and of interest only when operations inside the hermetic chamber (1) involve at least one phase of vacuum creation. As already mentioned, other types of environmental controlling means (8) can be connected to the hermetic chamber (1), such as coolers and heaters, gaz supplies or electrical supplies.

The interconnection link or interface cable or cables (9) connects, for example, the camera to the outside for displaying, and/or recording, and/or processing images of the sample (7). The interface cable (9) can also connect the camera to its power supply, but a separate cable can also be used for the power supply of the camera. The interface cable (9) can, for example, be of one of following types: USB2, USB3, GiGe, Firewire, Camera Link, CoaxPress or PCI, but custom cables or other specialty cables can also be used. The interface cable (9) transmits the camera signal to, for example, a computer such as a personal computer (10) and/or to a simple monitor. The computer (10) can, for example, optionally be configured to process, analyze and record images provided by the camera (5).

Figure 3:
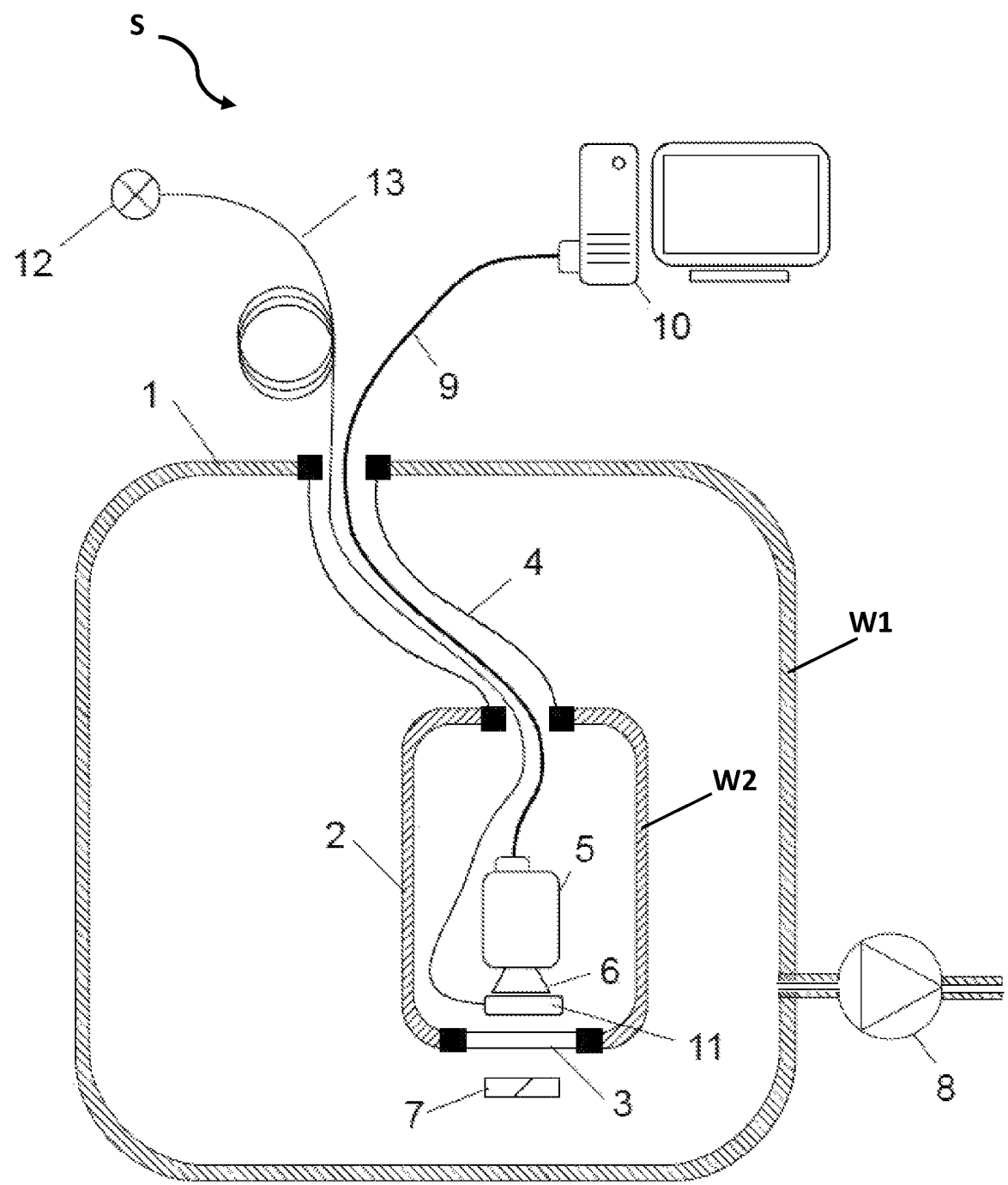
FIG. 3 depicts another exemplary implementation of an imaging system according to present disclosure including a camera and a light source.

As shown in FIG. 3, the rigid sealed enclosure (2) can, for example, also comprise an illumination system/element or illumination means (11) for illuminating the sample (7). In one embodiment schematically presented in FIG. 3, a flexible light guide (13) such as an optical fiber passing through the flexible connection (4) connects the illumination means (11) to a light source (12) located outside the hermetic chamber (1).

Figure 4:
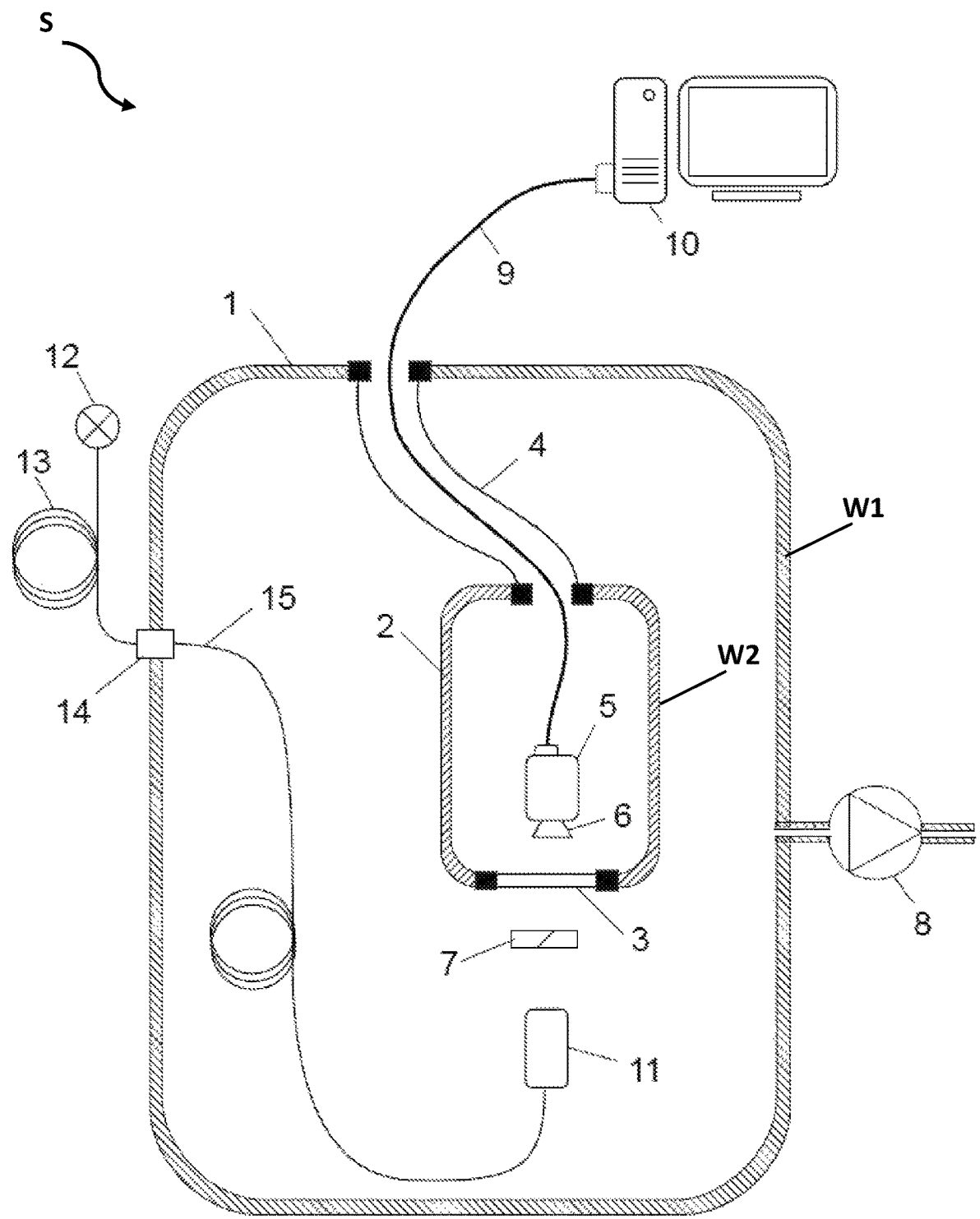
FIG. 4 depicts another exemplary implementation of an imaging system according to present disclosure comprising a light source delivered by use of a vacuum feedthrough.

In another embodiment schematically presented in FIG. 4, the illumination means (11) are additionally or alternatively not inside the rigid sealed enclosure (2) but located inside the hermetic chamber (1). The hermetic chamber (1) includes an optical fiber feedthrough (14) that is optically connected to the illumination means (11) by a light guide or an optical fiber (15) located inside the hermetic chamber (1). The optical fiber feedthrough (14) is connected to an external light source (12) via the flexible light guide (13). The configuration of FIG. 4 is of particular interest when the sample (7) is transparent, whereas the configuration of FIG. 3 is more specifically adapted when the sample (7) is a reflective sample.

Apparatuses or systems according to present disclosure can include a plurality of light sources (12), and/or a plurality of flexible light guides (13) passing through the flexible connection (4) to one or more illumination means (11). A plurality of optical fiber feedthroughs (14) can also be included to communicate light to one or more illumination means (11).

The optical fiber feedthrough (14) may comprise, for example, a body including an optical coupler. The body is received in a wall (W1) of the hermetic chamber (1) and seals the hermetic chamber (1), for example, using a metallic and/or elastomer seal. The body can be attached to the wall (W1) through for example welding thereto.

Alternatively, optical fiber feedthrough (14) may comprise or consist of a viewport, the viewport being included in the wall (W1) of the chamber (1). Light propagates outside the fibers (13, 15) and between the fibers (13, 15) and passes through the viewport. Optical elements, such as one or more lenses may be placed either side of the view port to optimize light coupling between the fibers (13, 15). Alternatively, such an element may only be present on one side of the viewport outside the chamber (1) or inside the chamber (1).

Alternatively, the viewport may comprise an optical element such as one or more lenses and/or gratings integrally formed in a window of the viewport to permit light coupling between the fibers (13, 15).

In one exemplary very simple implementation, illumination means (11) comprises or consists of a mechanical part or assembly (for example, a clamp) holding the end of one or more light guides (13, 15) and the sample (7) is illuminated by the radiation beam diverging from the end of the light guide (13).

Illumination means (11) can alternatively or additionally comprise or consist of one or more lenses, and/or one or more mirrors, and/or one or more optical splitters to shape and direct the beam for illuminating the sample (7). Illumination means (11) can also comprise optical filters to manage the spectral properties of the illuminating radiations.

Illumination means (11) can also include the above elements arranged to deliver several beams illuminating the sample (7) under different angle of incidence, and/or different divergence angles.

The flexible light guide (13) and/or light guide (15) can comprise or consist of for example an optical fiber of one of the following types: plastic optical fiber (POF), single mode (SM), multi-mode (MM) or polarization maintain (PM). The light guide (13, 15) can alternatively comprise or consist of a liquid light guide. A fiber ring illuminator, combining a flexible light guide (13) and integrated circular illumination means (11) can alternatively be used. As well, at least one portion of the light guide (13, 15), can be a nanostructured or nanoactive fiber. The light guide (13, 15) can also be a doped fiber providing radiation emission when pumped by an external laser (12).

In a preferred embodiment, the light source (2) is coupled into a flexible light guide (13) outside the rigid sealed enclosure (2), but the light source (12) can alternatively be located inside the rigid sealed enclosure (2), or inside the hermetic chamber (1) permitting the sample to be illuminated by light emitted from the source (12) with having to pass the light through the fiber. If the light source (12) is located inside the rigid sealed enclosure (2), or inside the hermetic chamber (1), the flexible light guide (13, 15) is unnecessary but its place may be taken by a power cable and its path can be used by the cable to connect the light source to a power supply. In this particular embodiment, the light source (12) could advantageously be a ring illuminator comprising several light sources such as LEDs on a circular frame, the light sources of the ring illuminator may have the same or different wavelengths.

In a preferred embodiment, the light source (12) emits at one or multiple optical wavelengths, including infrared and/or ultraviolet (UV) wavelengths, but other radiation sources can be used as long as the camera (5) is sensitive at these radiations. Exemplary light sources which can be used in the apparatuses or systems according to present disclosure include one or more of the following: Light emitting diodes (LED), microscopy lamps (tungsten-halogen, mercury arc, xenon arc, metal halide), laser diodes (LD), superluminescent diodes (SLD), or lasers in general, including fiber lasers or supercontinuum lasers.

Figure 5:
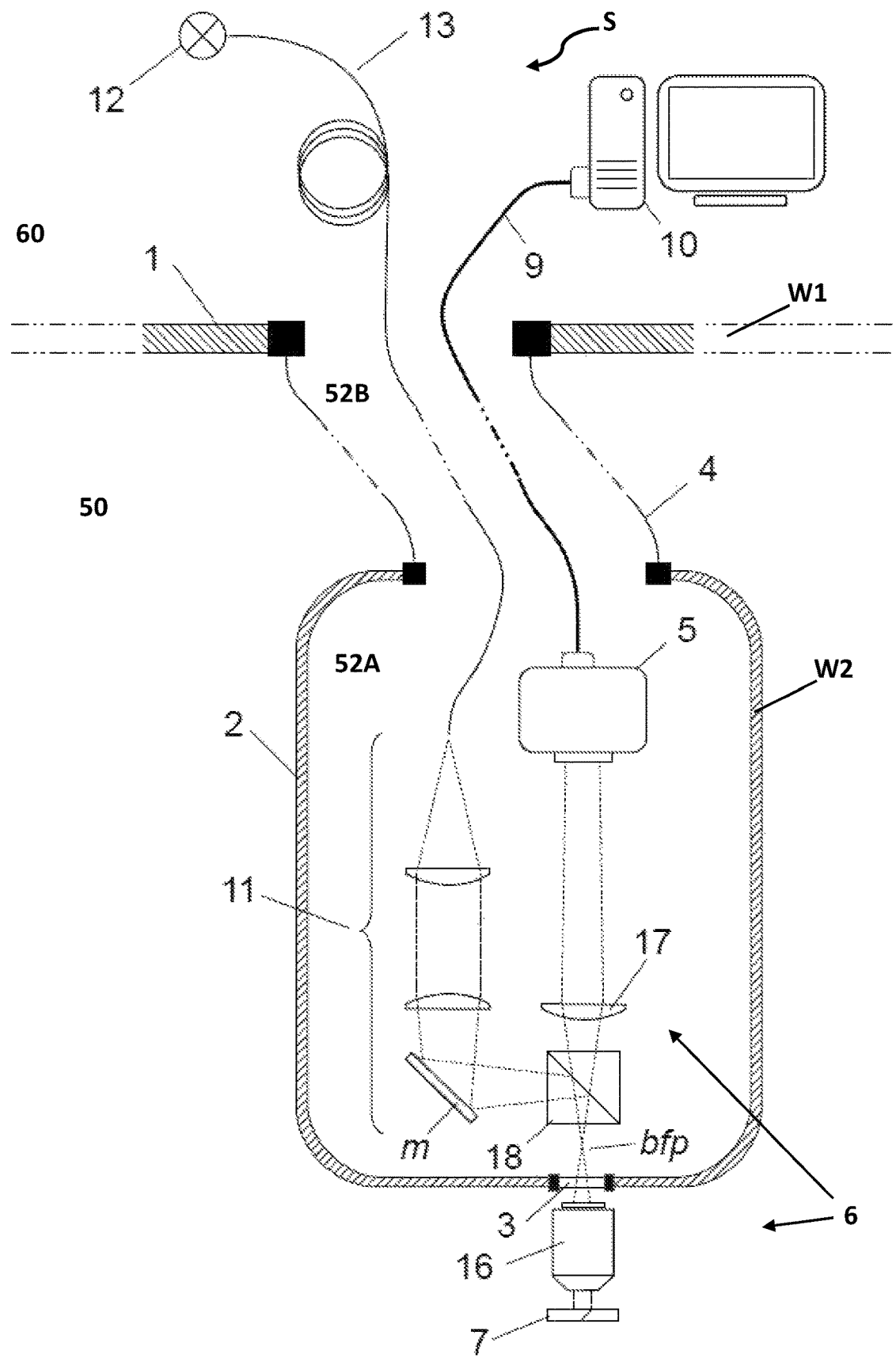
FIG. 5 depicts another exemplary implementation of a microscopy imaging system according to present disclosure.
Figure 6:
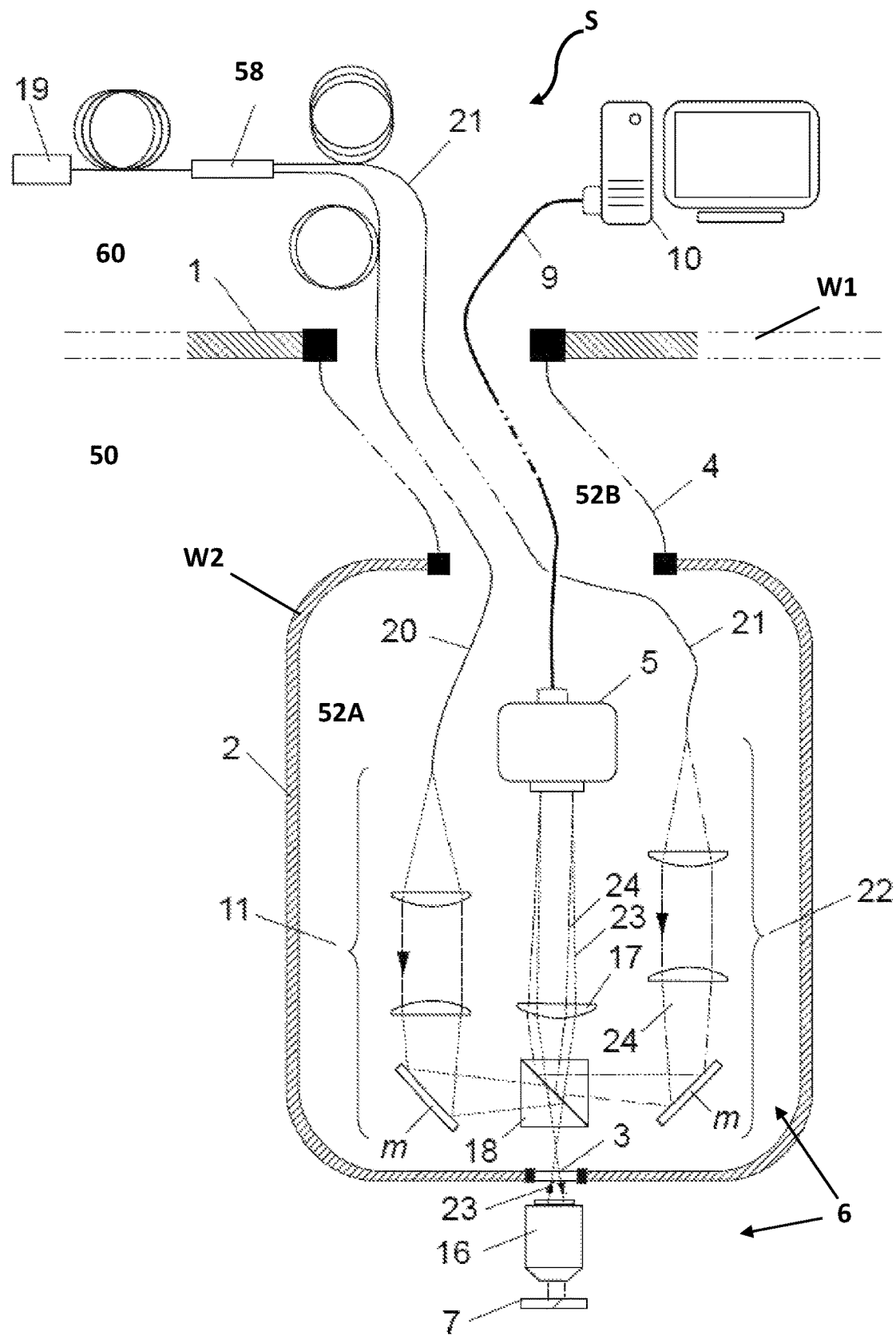
FIG. 6 depicts another exemplary implementation of a digital holographic microscopy imaging system according to present disclosure.

In FIGS. 5 and 6 the hermetic chamber (1) is no longer represented in its entirety, but only by a portion of its wall (W1) including the junction with the flexible connection (4). As well, the flexible connection (4), the camera interface cable (9), and the flexible light guide (13) are interrupted by dashed portions to suggest that they can be longer.

As presented in FIG. 5, imaging means (6) can comprise or consist of a lens, for example, a microscope objective lens (16) producing a magnified image of the specimen (7). In the exemplary implementation of FIG. 5, the microscope objective is not located inside the rigid sealed enclosure (2) but directly in front of the sample (7) and in the hermetic chamber (1). In this case, the design of the microscope objective (16) may have to be adapted for compatibility with the controlled environment confined by the hermetic chamber (1), for example a vacuum compatible design avoiding virtual leaks. The microscope objective (16) can alternatively be located inside the rigid sealed enclosure (2) with the transparent window (3) located between the sample (7) and the microscope objective (16). In this case, the microscope objective (16) may advantageously be of the glass corrected type, with an optical design correcting the aberrations induced by the thickness of the transparent window (3).

In a preferred embodiment, the microscope objective (16) can be of the infinity corrected type, and can be optically coupled to a lens (17), for example a tube lens (17) to form a magnified image of the sample (7) on the camera (5). With infinity corrected microscope objectives, the space between the microscope objective (16) and the tube lens (17) enables aberration-free or distortion-free introduction of splitting means (18) enabling, for example, to direct illuminating radiation onto the sample (7) through the microscope objective (16). The microscope objective (16) can alternatively be of the finite correction type and in this case the tube lens (17) can be eliminated. The lens (17) is contained inside the sealed enclosure (2).

The splitting means (18) can comprise or consist of an optical beam splitter such as a cube beam splitter, or a plate beam splitter, or a pellicle beam splitter. The splitting means (18) can be of the non-polarizing or of the polarizing types. If the splitting means (18) are of the polarizing type, half-waveplate and or quarter waveplates can be used to manage optical power levels transmitted and reflected by the splitting means (18). The splitting means (18) is contained inside the sealed enclosure (2) and can be, for example, optically arranged between the lens (17) and the microscope objective (16) or between the camera (5) and the microscope objective (16).

Apparatuses or systems according to present disclosure can also be used, for example, to perform fluorescence microscopy by use of a dichroic splitter as the splitting means (18), possibly in combination with excitation and emission optical filters.

FIG. 5 presents one exemplary implementation of the illumination system or means (11), comprising or consisting of two lenses and one mirror (m). The illumination means (11) as shown in FIG. 5 enables implementing the so-called Koehler illumination configuration, for which adjustable apertures can be optionally included to define field and aperture stops. Other implementations comprising a single lens are also possible. As well, the mirror (m) can be removed in the case where the flexible light guide (13) delivers illumination radiation propagating horizontally. A compact implementation without lenses nor mirrors is implemented by locating the end of the flexible light guide (13) close to or at the back focal plane of the microscope objective (16).

The microscope objective (16) can be of any quality type, and of any magnification. Magnification changes can be achieved by exchanging the microscope objective (16). A plurality of microscope objectives can be mounted on a turret or on a slider to enable rapid and easy magnifications changes.

The present disclosure is of particular interest for embedding digital holographic microscopy (DHM) systems in harsh or sensitive environments such as vacuum. A class of DHM systems particularly well adapted for being integrated according to present invention make use of fiber splitter devices as described in published patent application WO2018/078417 the content of which is fully incorporated herein by reference, including lensless DHM systems, DHM systems for large field of views, multi-wavelength DHM systems with at least two light sources, DHM systems including microscope objectives for high resolution, or DHM systems in both reflection and transmission configurations.

FIG. 6 presents an exemplary implementation of a DHM imaging system embedded inside the controlled environment defined by the system of the present disclosure. In this case, the light source comprises or consists of a coherent light source (19), of long or short coherence length, fiber coupled to a fiber splitter (58), which splits the light from the coherent light source (19) into an object fiber (20) and into a reference fiber (21). The coherent light source (19) can, for example, comprise or consist of a laser.

The object fiber (20) is arranged to deliver light to the illumination means (11), and the reference fiber (21) is arranged to deliver light to a reference wave creation unit (22).

The object fiber (20) and the illumination means (11) is configured to provide incident light to the sample 7, via for example, the splitting means (18) and/or the microscope objective (16). The light beam then reflected from the sample (7) defines or forms an object wave (23). The reference fiber (21) and the reference wave creation unit (22) directly form or define a reference wave (24) that is directed to the camera (5), via for example, the splitting means (18).

The illumination means (11), the reference wave creation unit (22) and the splitting means (18) are arranged one with respect to the other to form a hologram resulting from interference between the reference wave (24) and the object wave (23). The hologram is formed at the camera (5) so that the camera (5) can record the hologram resulting from the interference between the reference wave (24) and the object wave (23).

The reference wave creation unit (22) comprises or consists of, for example, two lenses and one mirror (m). Adjustable apertures can be optionally included to define field and aperture stops. A single lens configuration is also possible. The illumination means (11) may include the same elements previously described above in relation to the embodiment of FIG. 5.

In the exemplary implementation of FIG. 6, the microscope objective (16) transmits the illumination beam onto the sample (7) and collects reflected radiation to form the object wave (23).

Alternatively, sample illumination can also be implemented in transmission through the sample, by use of the optical fiber feedthrough (14) that is inserted at some point along the object fiber (20) to bring a portion of the optical fiber (20) inside the chamber (1), similar to the exemplary configuration of FIG. 4. The optical fiber and/or the illumination means (11) then illuminates the sample (7) from behind, as for example shown in FIG. 4. In such a case, the illumination means (11) does not necessary require the mirror (m) and may simply comprise one or a plurality of lenses.

In FIG. 6, the microscope objective (16) is located inside the hermetic chamber (1) but outside of the rigid sealed enclosure (2). In an alternative configuration, the microscope objective (16) is located inside the rigid sealed enclosure (2) and the microscope objective (16) is preferably corrected for aberrations induced by the thickness of the transparent window (3).

The lens (17), for example, tube lens (17) located between the splitting means (18) and the camera (5) as shown in FIG. 6 forms a magnified image of the sample (7) in an image plane located at a distance corresponding to the focal length of the tube lens (17). Locating the sensor of the camera (5) (at a certain distance) away from the image plane enables for the recording of out-of focus holograms, meaning that the object wave (23) doesn't form a focused magnified image of the sample (7) on the camera (5) sensor. In-focus holograms can alternatively be acquired by placing the sensor of the camera (5) in the image plane. An in-focus hologram is often considered as being an interferogram, and the corresponding apparatus or system can be considered as an interferometric or interference microscope. The tube lens (17) shown in FIG. 6 is required only if the microscope objective (16) is of the infinity corrected type, otherwise the lens (17) is absent.

Digital holography is also known as enabling lensless imaging, meaning that the object wave (23) propagates from the sample (7) to the camera (5) sensor without passing through optical elements, except for the splitting means (18). In this configuration, both the illumination means (11) and the reference creation means (22), may advantageously be realized without any lenses nor mirrors according to the disclosure of WO2018/078417 (see FIG. 1 of WO2018/078417 and corresponding description both of which is fully incorporated herein by reference).

When the camera (5) acquires the holograms such as holograms of interferograms, software, programs or algorithms installed on the personal computer (10) enable to reconstruct numerically intensity (or amplitude) images and phase contrast images of the sample (7), in particular, quantitative phase contrast images providing measurement possibilities, such as those of sample surface topography, sample optical thickness, sample refractive index, phase shift, or layer thickness distribution of the constituent layers of a sample (7). The computation of the amplitude and phase can, for example, be performed as described in references 1 to 4 below.

In the configuration of FIG. 6, the reference wave (24) propagates at an angle with respect to the object wave (23) in order to generate off-axis holograms or interferograms. In-line holograms or interferograms can alternatively be recorded when parallel propagation directions is used for both the reference wave (24) and the object wave (23) when they reach the camera sensor. In this case, illumination means (11) and/or the reference wave creation unit (22) may advantageously comprise a phase shifting element enabling phase shifting interferometry.

In a preferred embodiment, the fiber splitter (58) shown in FIG. 6 comprises or consists of a fiber splitter device, for example the fiber splitter device disclosed in WO2018/078417 (the description of which is incorporated herein in its entirety) and characterized by a fiber length difference meaning that the object fiber (20) is of a different length than the reference fiber (21), with a fiber length difference defined in order to equalize the optical path length (OPL) of both the reference wave (24) and the object wave (23).

Optionally, the reference fiber (21) and/or the object fiber (20) can be divided into several fiber portions interconnected by fiber-to-fiber connections. Optionally, a manual or motorized fiber delay line can be added along the reference fiber (21) and/or along the object fiber (20) in order to enable for optical path length adjustments. Optionally, portions of the reference fiber (21) and/or of the object fiber (20) can be located inside the hermetic chamber (1) and outside the rigid sealed enclosure (2), for example by use of the optical fiber feedthrough (14) previous described enabling to cross the hermetic chamber (1) wall (W1).

Although FIG. 6 presents the fiber splitter (58) located outside the hermetic chamber (1), it can also be disposed inside the rigid sealed enclosure (2), or along the flexible connection (4).

Fibers presented in FIG. 6, in particular the object fiber (20) and the reference fiber (21), and the fiber splitter (58) are preferentially of the polarization maintain type, but single mode or multimode fibers and fiber splitters can also be used.

The configuration of FIG. 6 is an exemplary implementation particularly well adapted for being integrated inside the rigid sealed enclosure (2) because the object fiber (20), the reference fiber (21) and the camera interface cable (9) are all pointing vertically in the alignment of the flexible connection (4). In the exemplary configuration of FIG. 6, two mirrors (m) are included, one in the illumination means (11), and one in the reference wave creation unit (22). This configuration is exemplary and configurations with more or less mirrors are equally possible to implement.

In the exemplary configuration of FIG. 6, two lenses are included in both the illumination means (11) and the reference wave creation unit (22). This configuration is exemplary and configurations with more or less lenses are equally possible to implement.

The coherent light source (19) presented in the exemplary implementation of FIG. 6 is fiber coupled to the optical fiber of the optical fiber splitter (58). Fiber coupling between the coherent light source (19) and the fiber splitter (58) can be direct, for example, the coherent light source (19) can be directly pigtailed to a fiber whose opposite end is entering into the fiber splitter (58), or the coupling can be indirect meaning recourse to a fiber-to-fiber connection. Optionally, a portion with free space beam propagation can be arranged between the coherent light source (19) and the fiber splitter (58), and such a free space portion can integrate optical filters and/or polarization management elements.

As described in published patent application WO2018/078417 (see FIG. 6 of WO/2018/078417 and corresponding description both of which are fully incorporated herein by reference), the exemplary implementation of FIG. 6 of the present disclosure can be configured for dual wavelength digital holographic microscopy (DHM). In this case, at least one additional coherent light source emitting at a different wavelength than the first coherent light source is coupled to a second fiber splitter, and a second reference beam is generated by duplicating the reference wave creation unit (22) and by replacing the mirror (m) of the reference wave creation unit (22) by a dichroic element combining the two reference beams before they enter the splitting means (18). Advantageously a dual wavelength DHM configuration is implemented by defining different off-axis situations (angles) for the different reference waves whereas the object waves are colinear.

The exemplary implementations of FIGS. 5 and 6 show microscopy configurations where imaging elements or means form a magnified image, but imaging elements or means reducing the image size can alternatively be implemented for imaging or measuring over a large field of view, larger than the camera sensor, for example as described in WO2018/078417 (see FIG. 2 of WO/2018/078417 and corresponding description both of which are fully incorporated herein by reference).

In a particular embodiment, one or more of the imaging elements or means and the transparent window (3) can be or can form a single or integrated element, which fulfills the dual function of imaging and sealing. For example, the splitting means (18) and/or mirror (M) and may form a single element with the window (3).

Apparatuses or systems according to present invention can combine several imaging systems embedded in the same hermetic chamber (1). In one embodiment several imaging systems, for example, the exemplary imaging systems of FIGS. 5 and 6, can share the same rigid sealed enclosure (2) and access radiation trough the same common transparent window (3). In another embodiment, the rigid sealed enclosure (2) can comprise several transparent windows (3), possibly located on different walls (W2) of the rigid sealed enclosure (2), and several imaging systems (for example, the exemplary imaging system of FIGS. 5 and 6) can image through these different transparent windows (3). Several rigid sealed enclosures (2) comprising each at least one imaging system, can be included and connected to different locations of the hermetic chamber wall (W1) by use of several flexible connections (4).

Finally, it's important to precise that implementations described herein are not intended to limit the scope of the present disclosure, but are just provided to illustrate possible realizations.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments and be given the broadest reasonable interpretation in accordance with the language of the appended claims. The features of any one of the above described embodiments may be included in any other embodiment described herein.

REFERENCES

1. EP1119798/US6262818: METHOD AND APPARATUS FOR SIMULTANEOUS AMPLITUDE AND QUANTITATIVE PHASE CONTRAST IMAGING BY NUMERICAL RECONSTRUCTION OF DIGITAL HOLOGRAMS
2. US7649160 APPARATUS AND METHOD FOR DIGITAL HOLOGRAPHIC IMAGING
3. E. Cuche, P. Marquet, and C. Depeursinge, "Simultaneous amplitude-contrast and quantitative phase-contrast microscopy by numerical reconstruction of Fresnel off-axis holograms", Appl. Opt. 38 (34), 6994-7001 (1999).
4. E. Cuche, F. Bevilacqua, and C. Depeursinge, "Digital holography for quantitative phase-contrast imaging", Opt. Lett. 24 (5), 291-293 (1999).

The invention claimed is:

1. An imaging system for imaging a sample immersed in a controlled environment, the imaging system comprising:
   at least one enclosure holding at least one imaging sensor or camera inside the at least one enclosure, the at least one enclosure including at least one opening through which the at least one imaging sensor or camera is inserted inside the at least one enclosure and at least one transparent window for imaging the sample;
   a vacuum chamber configured to define or confine said controlled environment, wherein the at least one enclosure is contained inside the vacuum chamber,
   a flexible channel comprising a first extremity and a second extremity, the first extremity being connected to the at least one enclosure at said at least one opening from which the flexible channel extends towards the vacuum chamber, and the second extremity of the flexible channel being configured to be connected to a wall of the vacuum chamber, the flexible channel defining or enclosing a passage extending through the flexible channel and to or into the at least one enclosure, and the second extremity of the flexible channel is connected to the vacuum chamber;
   at least one light source located outside said vacuum chamber and configured to provide radiation; and at least one flexible light guide to guide light radiation from the at least one light source;
   wherein the at least one enclosure contains a plurality of optical elements arranged to carry out microscopy imaging, interferometric imaging or holographic imaging of the sample, and
   the at least one flexible light guide is configured to guide light radiation from the at least one light source to the plurality of optical elements arranged to carry out microscopy imaging or interferometric imaging or holographic imaging of the sample,
   and the imaging system further includes a microscope objective lens located between (i) said plurality of optical elements arranged to carry out microscopy imaging or interferometric imaging or holographic imaging and (ii) the sample to collect reflected light radiation from the sample to produce a magnified image of the sample on the at least one imaging sensor or camera during microscopy imaging, interferometric imaging or holographic imaging of the sample, and the microscope objective lens is located inside said vacuum chamber and outside the at least one enclosure between the sample and the at least one transparent window for imaging the sample, and the enclosure includes a tube lens to receive light from the microscope objective lens to produce a magnified image of the sample on the at least one imaging sensor or camera during microscopy imaging, interferometric imaging or holographic imaging of the sample, the tube lens being located inside said enclosure and between the microscope objective lens and the at least one imaging sensor or camera.

2. System according to claim 1, wherein the flexible channel comprises or consists of an elongated vessel configured to be compressed and extended and defining or enclosing said passage; or the flexible channel comprises or consists of a corrugated or convoluted body defining or enclosing said passage.

3. System according to claim 1, wherein the flexible channel and/or the at least one enclosure are configured to define or enclose an environment different to the controlled environment.

4. System according to claim 1, wherein the flexible channel defines a volume containing an environment isolated from the environment enclosed by the vacuum chamber.

5. System according to claim 1, wherein the flexible channel is located inside the vacuum chamber and the at least one enclosure is fully contained inside the vacuum chamber.

6. System according to claim 1, wherein the flexible channel is configured to transport thermal energy away from the at least one enclosure to cool the environment of the at least one enclosure.

7. System according to claim 1, further including a mounting element attached to the at least one enclosure and to a surface of the vacuum chamber.

8. System according to claim 1 further comprising:

illumination means located inside said at least one enclosure and configured to direct said light radiation towards said sample to illuminate said sample with said light radiation, wherein the at least one flexible light guide passes through said flexible channel to guide said light radiation from said at least one light source to said illumination means.

9. System according to claim 1, further comprising:

illumination means located inside said vacuum chamber and configured to direct said light radiation towards said sample to illuminate said sample with said light radiation, a least one optical fiber feedthrough located in and crossing the wall of said vacuum chamber, at least one second flexible light guide configured to guide said light radiation from the at least one optical fiber feedthrough to said illumination means, wherein the at least one flexible light guide is configured to guide said light radiation from the at least one light source to the at least one optical fiber feedthrough.

10. System according to claim 1 further comprising:

a coherent light source located outside said vacuum chamber and configured to provide said light radiation, a fiber or fiber source configured to guide said light radiation from said coherent light source to a fiber splitter, said fiber splitter being configured to split the light radiation from said fiber source and provide the split light radiation into an object fiber and into a reference fiber, illumination means arranged to collect light radiation from said object fiber, and direct said light radiation towards said sample to illuminate said sample with an object wave, a reference wave creation unit located inside said at least one enclosure, said reference wave creation unit being configured to collect light radiation from said reference fiber, and to form a reference wave, from said light radiation, directed towards said at least one imaging sensor or camera, splitting means adapted combine light radiation arriving from different directions, and wherein said illumination means, said splitting means and said reference wave creation unit are arranged in such a way that said at least one imaging sensor or camera may record a hologram or an interferogram resulting from an interference between the object wave and the reference wave.

11. System according to claim 10, wherein said illumination means are located inside said at least one enclosure and wherein said flexible channel is traversed by at least one of the reference fiber, the object fiber, or the fiber connecting said coherent source to said fiber splitter.

12. System according to claim 10, wherein:

said fiber splitter is located outside said vacuum chamber, said object fiber passes through said flexible channel, said illumination means is located inside said vacuum chamber, said vacuum chamber comprises at least one optical fiber feedthrough, said reference fiber is connected on an external side of said optical fiber feedthrough, said external side being located outside the vacuum chamber, said illumination means is connected to an internal side of said optical fiber feedthrough by an additional fiber located inside said vacuum chamber, said internal side being located inside the chamber.

13. System according to claim 10 wherein said hologram or interferogram is of the off-axis type, meaning that the propagation direction of said reference wave has a given angle or defines a predetermined angle with respect to a propagation direction of said object wave when these two waves arrive on said at least one imaging sensor or camera.

14. System according to claim 13, wherein the system is adapted for dual-wavelength digital holographic microscopy by furthermore comprising:

at least one additional coherent light source, at least one additional fiber or fiber source, at least one additional fiber splitter, at least one additional object fiber, at least one additional reference fiber, at least one additional reference wave creation unit, and dichroic elements, and wherein said illumination means, said splitting means, said dichroic elements and said reference wave creation units are arranged to permit said at least one imaging sensor or camera to record a hologram resulting from interference between two co-linear object waves and two reference waves defined with different off-axis angles.

15. System according to claim 1, wherein the vacuum chamber comprises or consist of a process chamber for performing etching or material deposition.

16. System according to claim 1, wherein said controlled environment that is a different environment to the environment or atmosphere enclosed by the at least one enclosure and/or the flexible channel consists of an atmosphere or environment having a different chemical composition or a different humidity, or a different temperature, or a different pressure.

17. System according to claim 1, including at least one optical beam splitter located inside the at least one enclosure and inside the vacuum chamber, the at least one optical beam splitter being located between the tube lens and the microscope objective lens, and
   wherein the at least one imaging sensor or camera, the at least one optical beam splitter and the tube lens are located inside the at least one enclosure and inside the vacuum chamber, and the at least one optical beam splitter and the tube lens are located between (i) the microscope objective lens and (ii) the at least one imaging sensor or camera.

18. System according to claim 17, wherein the at least one flexible light guide passes through said flexible channel, and the at least one flexible light guide includes a light output extremity arranged to provide light radiation from said at least one light source to the plurality of optical elements arranged to carry out microscopy imaging or interferometric imaging or holographic imaging of the sample, wherein the light output extremity is located inside the at least one enclosure and inside the vacuum chamber.

19. System according to claim 18, wherein the at least one enclosure includes at least one wall extending to hold the at least one transparent window, and wherein the microscope objective lens is fully detached from the at least one wall and fully located inside the vacuum chamber.

\* \* \* \* \*